United States Patent
Wenzel et al.

(10) Patent No.: US 12,325,204 B2
(45) Date of Patent: *Jun. 10, 2025

(54) HEATING PRESS AND METHOD FOR VULCANIZING A VEHICLE TIRE IN SAID HEATING PRESS UNDER VACUUM

(71) Applicant: Continental Reifen Deutschland GmbH, Hannover (DE)

(72) Inventors: Karsten Wenzel, Helpsen (DE); Horst Wedekind, Garbsen (DE); Michael Ramm, Garbsen (DE)

(73) Assignee: Continental Reifen Deutschland GmbH, Hannover (DE)

( * ) Notice: Subject to any disclaimer, the term of this patent is extended or adjusted under 35 U.S.C. 154(b) by 106 days.

This patent is subject to a terminal disclaimer.

(21) Appl. No.: 18/247,919

(22) PCT Filed: Oct. 4, 2021

(86) PCT No.: PCT/DE2021/200142
§ 371 (c)(1),
(2) Date: Apr. 5, 2023

(87) PCT Pub. No.: WO2022/073567
PCT Pub. Date: Apr. 14, 2022

(65) Prior Publication Data
US 2023/0373177 A1     Nov. 23, 2023

(30) Foreign Application Priority Data

Oct. 5, 2020   (DE) .................... 10 2020 212 550.3

(51) Int. Cl.
*B29D 30/06*       (2006.01)
(52) U.S. Cl.
CPC ..... *B29D 30/0601* (2013.01); *B29D 30/0605* (2013.01); *B29D 30/0662* (2013.01); *B29D 30/0629* (2013.01)

(58) Field of Classification Search
CPC .......................... B29D 30/0605; B29D 30/60
See application file for complete search history.

(56) References Cited

U.S. PATENT DOCUMENTS 3,550,196 A    12/1970   Gazuit
4,508,497 A *  4/1985   Beres ................ B29D 30/0605
                                                425/29

(Continued)

FOREIGN PATENT DOCUMENTS

CN    117245956 A  * 12/2023  ............. B29C 33/46
DE      1779130 A1    9/1971

(Continued)

OTHER PUBLICATIONS

The International Search Report and the Written Opinion of the International Searching Authority mailed on Jan. 4, 2022 for the counterpart PCT Application No. PCT/DE2021/200142.

*Primary Examiner* — Benjamin A Schiffman
(74) *Attorney, Agent, or Firm* — Richard A. Wolf; Gregory Adams

(57) ABSTRACT

A heating press for vulcanizing a vehicle tire under a vacuum, having a heating press upper part (3) and a heating press lower part (6), the heating press upper part (3) has a hood upper part (4) mounted thereon and a container (2), which contains mold parts (16, 18, 21) of a segmented vulcanizing mold, in this hood upper part (4), wherein the hood upper part (4) has a first circular ring (23), which is arranged fixedly on the heating press upper part (3), and a second circular ring (24), which adjoins this first circular ring coaxially in an axial direction and can be telescopically retracted and extended on the inside of the first circular ring (23) in an axial direction P1, wherein vacuum-tight seals (5, 9) are arranged between the two circular rings (23, 24) and between the second circular ring (24) and the heating press lower part (6).

12 Claims, 11 Drawing Sheets

(56) References Cited

U.S. PATENT DOCUMENTS

| | | | |
|---|---|---|---|
| 4,563,139 A * | 1/1986 | Yokoyama | B29D 30/0605 425/32 |
| 5,145,688 A | 9/1992 | Ohtake | |
| 5,196,206 A * | 3/1993 | Troia | B29C 33/02 425/210 |
| 6,406,360 B1 * | 6/2002 | Nguyen | B24C 3/06 451/92 |
| 6,923,879 B1 * | 8/2005 | Blickwedel | B29D 30/72 156/130.7 |
| 7,056,109 B2 * | 6/2006 | Kata | B29D 30/0629 425/46 |
| 7,527,489 B2 * | 5/2009 | Steinke | B29C 39/42 425/546 |
| 7,963,756 B2 * | 6/2011 | Bachochin | B29D 30/0605 425/46 |
| 10,493,665 B2 * | 12/2019 | Wenzel | B29D 30/0606 |
| 10,821,688 B2 * | 11/2020 | Stoila | B29C 33/202 |
| 11,752,717 B2 * | 9/2023 | Takahashi | B29C 33/02 425/28.1 |
| 12,246,500 B2 * | 3/2025 | Wenzel | B29D 30/0662 |
| 12,246,501 B2 * | 3/2025 | Wenzel | B29D 30/0605 |
| 12,246,502 B2 * | 3/2025 | Wenzel | B29D 30/0662 |
| 2010/0282387 A1 * | 11/2010 | Wenzel | B60C 11/00 152/209.15 |
| 2011/0262572 A1 * | 10/2011 | Fricke | G01J 5/00 425/29 |
| 2022/0143942 A1 * | 5/2022 | Takahashi | B29C 33/10 |
| 2023/0373176 A1 * | 11/2023 | Wenzel | B29D 30/0605 |
| 2023/0382067 A1 * | 11/2023 | Wenzel | B29D 30/0662 |
| 2023/0405951 A1 * | 12/2023 | Wenzel | B29D 30/0601 |
| 2024/0042714 A1 * | 2/2024 | Wenzel | B29D 30/0601 |
| 2024/0173931 A1 * | 5/2024 | Pierre | B29D 30/0605 |

FOREIGN PATENT DOCUMENTS

| | | | | |
|---|---|---|---|---|
| DE | 102018216754 A1 | | 4/2020 | |
| DE | 102023204308 A1 | * | 11/2024 | |
| JP | 2010179638 A | * | 8/2010 | |
| KR | 20120057898 A | | 6/2012 | |
| WO | WO-2021223822 A1 | * | 11/2021 | B29D 30/0601 |

* cited by examiner

HEATING PRESS AND METHOD FOR VULCANIZING A VEHICLE TIRE IN SAID HEATING PRESS UNDER VACUUM

BACKGROUND

The invention relates to a heating press for vulcanizing a vehicle tire, having a heating press upper part and a heating press lower part, wherein the heating press upper part has a hood upper part mounted thereon and a container, which contains a mold part of a vulcanizing mold, in this hood upper part, wherein the heating press upper part and the heating press lower part are connected to the container such that, when the heating press upper part is being lowered through a total stroke that takes place in an axial direction, during which total stroke the open end of the hood upper part moves onto the heating press lower part, the mold parts of the vulcanizing mold can be closed in the radial direction.

The invention furthermore relates to a method for vulcanizing a green tire in this abovementioned heating press.

The above-described heating press is a standard heating press for vulcanizing vehicle tires under atmospheric conditions.

The heating press comprises a so-called container which comprises the actual segmented vulcanizing mold with the mold segments and sidewall shells and bead rings, which mold the tire. Furthermore, heating chambers are provided for controlling the temperature of the molding parts. During the vulcanization, the container is surrounded by a closed hood which, in the prior art, serves primarily for temperature insulation during the vulcanization.

In order to as far as possible avoid defects on the tire surface, the air between the surface of the green tire and the surface of the mold faces must be removed. For this purpose, it is generally known for 1000 to 5000 ventilation valves to be provided in the mold faces of the mold parts. By means of these ventilation valves, the air from the mold cavity is discharged radially and axially outward through ventilation channels. However, the mold parts of a new vulcanizing mold have to be equipped with these valves. Furthermore, these valves tend to become dirty owing to rubber that ingresses from the tire for vulcanization, such that said valves have to be exchanged or cleaned, which requires great outlay.

SUMMARY

The invention is based on the object of providing a heating press for vulcanizing a vehicle tire under a vacuum, with which vehicle tires can be reliably vulcanized without the need for ventilation valves in the vulcanizing mold. It is likewise an object of the invention to provide a method for vulcanizing a vehicle tire in an efficient manner in terms of time.

The object is achieved in relation to the heating press in that the hood upper part has a first circular ring, which is arranged fixedly on the heating press upper part, and a second circular ring, which adjoins this first circular ring in an axial direction and can be displaced in over the first circular ring in an axial direction P1, vacuum-tight seals are arranged between the two circular rings and between the second circular ring and the heating press lower part, the total stroke (GH) can be traveled in a manner composed of a first partial stroke ($TH_1$) and a second partial stroke ($TH_2$), after the first partial stroke, the hood upper part can be moved in such a way that it rests on the heating press lower part by way of the second circular ring, and the interior space of the hood upper part is closed in a vacuum-tight manner by the seals although the vulcanizing mold is still open in an air-permeable manner and, in order to generate a vacuum in the interior space of the hood before completely closing the vulcanizing mold, a pump and a vacuum tank, by means of which a vacuum can be generated in the interior space of the hood after the first partial stroke, are provided, wherein the vacuum tank and the pump are connected to the interior space of the hood, and wherein the vacuum tank and the pump are connected to one another, and, after the second partial stroke, the hood upper part can be moved in such a way that the second circular ring can be displaced in further in relation to the first circular ring and the vulcanizing mold can be closed in an airtight manner under vacuum conditions in the interior space of the hood.

The vacuum that can be obtained after the first partial stroke serves to remove the air from the not yet completely closed vulcanizing mold, in particular to remove the air between the outer surface of the tire and the mold faces of the shaping parts of the vulcanizing mold, in order, after the second partial stroke, which makes it possible to completely close the vulcanizing mold, to be able to manufacture the tire for vulcanization with high quality and without defects.

The term "circular ring" has the meaning of "cylinder with approximately circular-ring-shaped cross section".

It is furthermore essential that the vulcanizing mold itself has no ventilation means for ventilating the mold cavity. The 1000 to 5000 ventilation valves arranged in the vulcanizing mold in the prior art, through which ventilation valves the air from the mold cavity is discharged radially to the outside, are omitted by virtue of the vulcanization being performed under a vacuum. In this way, post-processing of the rubber flash that is formed on the tire by the ventilation means is no longer necessary, and the exchange and/or cleaning of ventilation valves that are no longer functional can be dispensed with. These are time-consuming and expensive. Furthermore, by virtue of the vulcanization being performed under a vacuum, the vulcanized tire takes on an external form which is absolutely free from defects and is thus of perfect appearance.

In addition, it is essential according to the invention for the hood upper part to have two circular rings, the first circular ring of which is arranged fixedly on the heating press upper part and the second circular ring of which can be telescopically displaced in over the first circular ring. This has the effect that—with both circular rings of the hood upper part having been extended and the hood having been lowered onto the heating press lower part—a vacuum-tight interior space of the hood around the container can be achieved by means of the seals provided, although the vulcanizing mold is not yet completely closed. It is explicitly the intention that no modifications with regard to measures for providing vacuum-tightness be made to the container or to the vulcanizing mold itself.

The term "vacuum" refers to air pressure in the range from 950 mbar (abs) to 0.1 mbar (abs).

The ring seal preferably has a round, polygonal or flat cross section.

It is expedient if a hydraulic, pneumatic or electric actuator, which can move the second circular ring of the hood upper part in an axial direction, is provided.

A hood lower part in the form of a third circular ring is preferably arranged on the heating press lower part of the heating press. In that case, depending on the relative size of the diameter of the second circular ring of the hood upper part to the diameter of the third circular ring of the hood lower part, there is a different arrangement of the sealing ring between the second circular ring of the hood upper part and the third circular ring of the hood lower part.

If the diameter of the second circular ring of the hood upper part is slightly greater than the diameter of the third circular ring of the hood lower part, either the third circular ring has a vacuum-tight seal around the periphery on its outer side or the second circular ring has a vacuum-tight seal around the periphery on its inner side. The seal seals off the small intermediate space between the second circular ring of the hood upper part and the third circular ring of the hood lower part when the second circular ring rests on the hood lower part. This is the case when the heating press has traveled at least through the first partial stroke ($TH_1$) of the total stroke (GH).

If the diameter of the second circular ring of the hood upper part is exactly the same size as the diameter of the third circular ring of the hood lower part, either the third circular ring has a vacuum-tight seal around the periphery on its upper side or the second circular ring has a vacuum-tight seal around the periphery on its lower side. The seal then provides sealing if the second circular ring rests on the third circular ring of the hood lower part. This is the case when the heating press has traveled at least through the first partial stroke ($TH_1$) of the total stroke (GH).

If the diameter of the second circular ring of the hood upper part is slightly less than the diameter of the third circular ring of the hood lower part, either the third circular ring has a vacuum-tight seal around the periphery on its inner side or the second circular ring has a vacuum-tight seal around the periphery on its outer side. The seal seals off the small intermediate space between the second circular ring of the hood upper part and the third circular ring of the hood lower part when the second circular ring rests on the hood lower part. This is the case when the heating press has traveled at least through the first partial stroke ($TH_1$) of the total stroke (GH).

In a certain embodiment of the invention, a hood lower part in the form of a third circular ring is arranged on the heating press lower part, wherein the first circular ring of the hood upper part and the third circular ring of the hood lower part have the same inside diameter and the same outside diameter and are arranged in line with one another in the heating press. This results in very reliable sealing of the hood interior space, in particular when a sealing ring is also arranged on the upper end of the third circular ring or on the lower end of the first circular ring.

In this embodiment, it is then preferably the case that the third sealing ring also has a vacuum-tight seal around the periphery on its inner side that provides sealing between the second circular ring of the hood upper part and the third circular ring of the hood lower part when the second circular ring rests on the hood lower part. This is the case when the heating press has traveled at least through the first partial stroke ($TH_1$) of the total stroke (GH).

It is expedient if the seals are ring seals, and at least one ring seal is arranged in the lower region of the hood upper part and at least one further ring seal is arranged in the upper region of the hood lower part. The vacuum is generated by ensuring that the first and the second circular ring of the hood upper part and the third circular ring of the hood lower part are sealed off with respect to one another in each case by at least one ring seal.

It is expedient for reliable sealing if the ring seals are arranged in circular-ring-shaped grooves, wherein the diameter of the ring seals is slightly greater than the depth of the grooves. Slightly greater means that the seal, when installed into the groove and in the sealing state, is compressed by at most 40% in relation to the compression-free geometry of the seal. Through the exact design of the groove in relation to the seal geometry, damage to the seal(s) as a result of the (relative) movements of the two or three circular rings is prevented, and durability is improved.

In one embodiment of the invention, the ring seals consist of solid material. The solid material may consist of one or more materials that are known for seals, such as FKM or FFKM. These seals are inexpensive and easy to handle.

In another embodiment of the invention, the ring seals are hoses of variable diameter. This has the advantage that less load is exerted on the ring seal by relative movements between circular rings of the hood, and the diameter of said ring seal is enlarged only when the sealing action is necessary.

It is advantageous if the ring seals are differentially inflated double ring seals. This has the advantage that any leakage can be compensated with low levels of pump power.

The vacuum-tight sealing can also be effected between the first circular ring and the second circular ring of the hood upper part by means of an elastically extensible, vacuum-tight rubber sleeve. This is secured in a circular shape on the outside of the lower part of each of the two circular rings.

In order to improve mechanical support of the hood parts, or the circular rings, against one another, it is expedient if sliding bands composed of wear-resistant high-temperature polymer, for example of PEEK, are arranged in the hood parts, or on the circular rings, in the region above and/or below the ring seals.

It is expedient if the vacuum tank has a volume that is approximately 5 to 10 times greater than the volume of the closed hood (including mold, container, green tire, heating bellows). It is hereby ensured that a vacuum can be reliably generated in the hood. Furthermore, the time required for the generation of the required vacuum is significantly reduced. This may take place during the course of the normal loading and unloading process.

With regard to the method with an abovementioned heating press, the invention is achieved in that the following steps are performed in succession:
  a) loading the open heating press by inserting the green tire for vulcanization into the container, wherein the second circular ring of the hood upper part is retracted in over the first circular ring,
  b) moving the heating press upper part through the first partial stroke, extending the second circular ring toward the heating press lower part until it rests on the heating press lower part, in order to obtain a closed hood interior space, while the vulcanizing mold is only closed to some extent,
  c) only if the ring seals are a hose of variable diameter: inflating the circular-ring-shaped hose seal in order to seal off the hood in vacuum-tight fashion,
  d) opening the connection between the vacuum tank and the hood interior space in order to generate a partial vacuum, by way of pressure equalization between the vacuum tank and the hood interior space, in the hood interior space that has been closed in a vacuum-tight manner, e) when the partial vacuum is obtained in the hood interior space: closing the connection between the vacuum tank and the hood, opening the connection between the hood interior space and the pump, and pumping the remaining air out of the hood interior space in order to generate the vacuum, f) moving the heating press upper part through the second partial stroke, during which the second circular ring is retracted in over the first circular ring, with the result that the vulcanizing mold is completely closed, and subsequently closing the connection between the hood interior space and the pump, g) vulcanizing the green tire and opening the connection between the pump and the vacuum tank and generating a vacuum in the vacuum tank, wherein the connection of the pump to the hood interior space and the connection of the vacuum tank to the hood interior space are each closed, h) opening the heating press and unloading the fully vulcanized tire, and repeating the steps a)-h) in order to vulcanize each further tire.

The tire vulcanization can be performed in an efficient manner in terms of time by way of the above-stated method. During the vulcanization of a first tire, the vacuum tank is already prepared for the generation of the vacuum in the hood for the vulcanization of a second, subsequent tire, such that a vacuum can be generated in the hood within an extremely short time.

It is advantageous if, to facilitate step h), this is preceded by a further valve arranged in the hood being opened in order to deplete the vacuum in the hood and subsequently being closed again.

BRIEF DESCRIPTION OF THE DRAWINGS

An exemplary embodiment of a heating press and the method for vacuum vulcanization of a pneumatic vehicle tire, together with further advantages, will be described on the basis of the following schematic FIGS. 1 to 4. In the figures.

DETAILED DESCRIPTION

Figure 1:
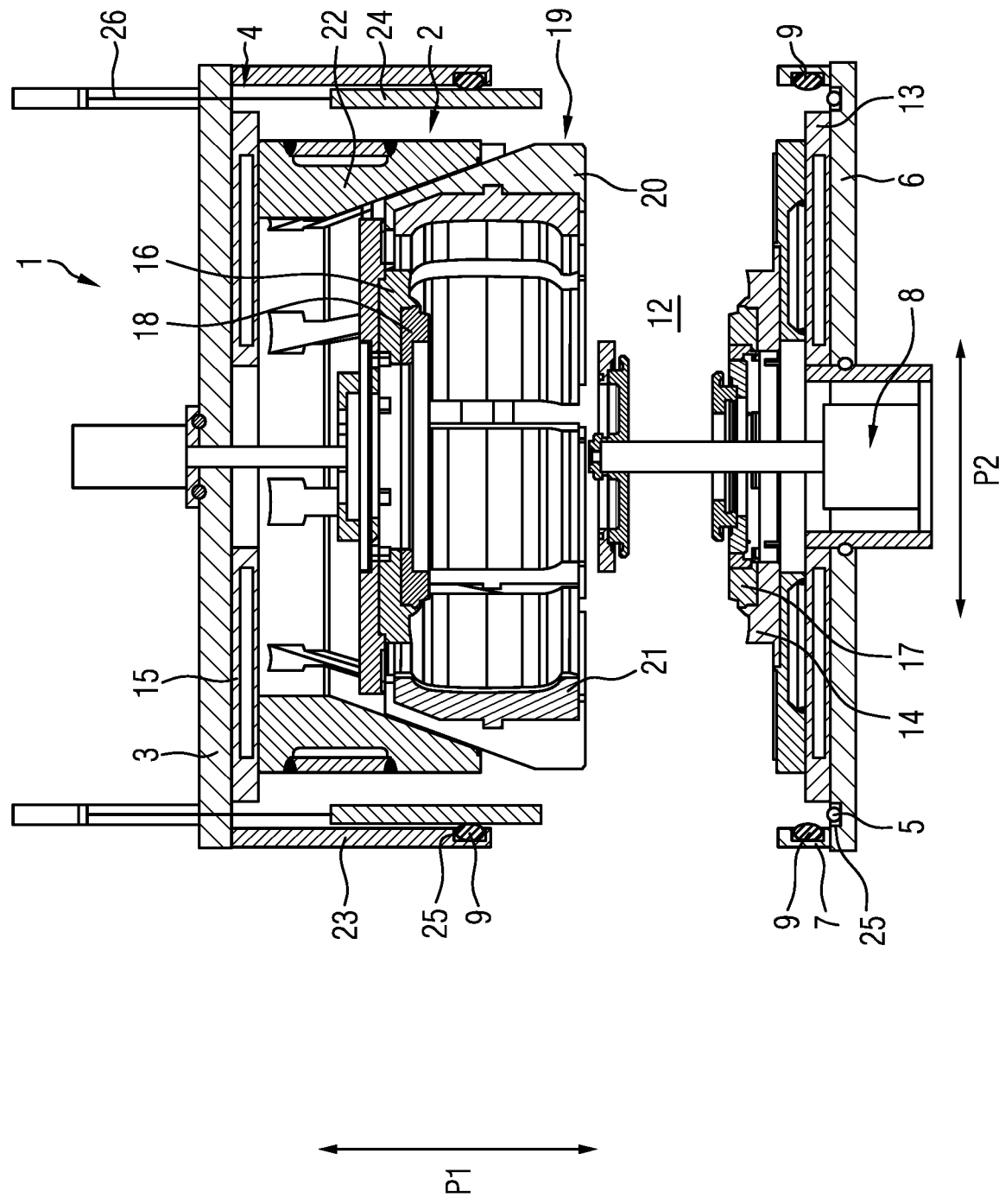
FIG. 1 shows a first embodiment of a heating press according to the invention with a container in the open state.

FIG. 1 shows a first embodiment of a heating press 1 according to the invention with a container 2 in the open state. The green tire can be placed into the heating press 1.

The heating press 1 comprises a heating press upper part 3, which is connected to the hood upper part 4, and a heating press lower part 6, which is connected to the hood lower part 7 and has the corresponding mechanisms for positioning the tire for vulcanization, for actuating the constituent parts of the vulcanizing mold, for introducing the heating media, and for removing the fully vulcanized tire. During the vulcanization operation, the container 2 is enclosed by the two-part hood 4, 7. The hood upper part 4 has a first and a second circular ring 23, 24, wherein the second circular ring 24 is provided with a smaller diameter than the first circular ring 23. The second circular ring 24 can be telescopically retracted and extended on the first circular ring 23 in an axial direction P1 by means of an actuator 26. The hood lower part 7 has a third circular ring. The third circular ring 7 and the first circular ring 23 of the hood upper part 3 have the same inside diameter and the same outside diameter and are arranged with their end faces in line in the heating press 1. The diameter of the second circular ring 24 of the hood upper part 4 is slightly smaller than the diameter of the third circular ring 7 of the hood lower part.

A "central mechanism" 8 is provided. This is likewise charged with seals—to the extent necessary—in order to establish vacuum-tightness between the central mechanism and the heating press upper and lower parts. A heating bellows (not illustrated) that can be placed into the green tire (not illustrated) is fastened to the central mechanism 8. Furthermore, nozzles (not illustrated) are arranged on the central mechanism 8, through which nozzles a heating medium can be introduced into the heating bellows (not illustrated).

The hood upper part 4 and the hood lower part 7 are airtight, or vacuum-tight, and in the closed state form a vacuum-tight hood interior space 12. To that end, ring seals 5, 9 are provided. A ring seal 9 is arranged between the first and the second circular ring 23, 24 in a groove 25, which is arranged in the first circular ring 23 and faces the second circular ring 24, for an airtight hood upper part 3. Similarly, a ring seal 9 is arranged around the periphery in a groove 25, corresponding to that in the first circular ring 23, in the third circular ring 7 on its inner side. A further horizontal ring seal 5 is arranged in line with the second circular ring 24 in a groove 25 which is open toward the heating press upper part 3. Therefore, the closed hood is airtight at the joints between the hood upper part 4 and the hood lower part 7, and between the first and the second circular ring 23, 24. The ring seal 5, 9 is a hose of variable diameter. The diameter of the ring seal 5, 9 is slightly greater than the depth 27 of the groove 25.

A vacuum can be generated in the hood interior space (=interior space of the hood) 12 by means of a pump 10 and a vacuum tank 11, wherein the vacuum tank 11 and the pump 10 are connected to the interior space 12 of the hood, and wherein the vacuum tank 11 and the pump 10 are connected to one another. By virtue of a vacuum being provided in the hood interior space 12, in particular during the molding and the vulcanization of the tire, conventional ventilation valves arranged in the mold face of the vulcanizing mold are omitted entirely. The means, connected to the heating press, for generating a vacuum in the interior space of the hood of the heating press, such as the pump 10, the vacuum tank 11 and associated lines and valves, are only shown in FIG. 3 for the sake of simplicity, but they are present in each of the embodiments shown.

The container 2 is a conventional container 2 that is already known in the prior art.

The container 2 contains the segmented vulcanizing mold with a lower heating plate 13, a lower sidewall shell 14, an upper heating plate 15, an upper sidewall shell 16, a lower bead ring 17 and an upper bead ring 18. Those constituent parts of the vulcanizing mold that are moved in a vertical (=axial) direction (arrow P1) for the purposes of opening and closing include the segment ring 19, composed of seven to nine segment shoes 20, and the profile/mold segments 21 fastened thereto and also the upper sidewall shell 16 with the upper bead ring 18. The segment shoes 20 are moved apart radially, in the direction of the arrow P2, to close and open the vulcanization mold. On the upper heating plate 15, there is arranged a closing ring 22 which has a beveled inner surface which interacts with beveled outer surfaces of the segment shoes 20 of the segment ring 19 such that, during the closing of the vulcanizing mold, the segment shoes 20 are moved together in a radial direction to form the closed segment ring 19. In the lower heating plate 13, the upper heating plate 15 and in the closing ring 22, there are incorporated heating chambers into which at least one heating medium, in particular saturated steam (water vapor), is introduced for the vulcanization of the tire. In this way, the green tire (not illustrated) is heated from the outside via the segment shoes 20, the sidewall shells 14, 16 and the bead rings 17, 18, such that this heating is commonly referred to as external heating.

A conventional heating bellows (not illustrated) is provided in a known manner and is filled with at least one pressurized heating medium in order to center the green tire in the mold from the inside, wherein the heating bellows is brought into a toroidal shape conforming to a tire. Since the green tire is heated by means of the heating bellows from the inside, this type of heating is referred to as internal heating.

In FIG. 1, the heating press 1 is open, with the second circular ring 24 of the hood upper part 3 having been telescopically retracted over the first circular ring 23. The green tire can be placed into the container 2.

Figure 2:
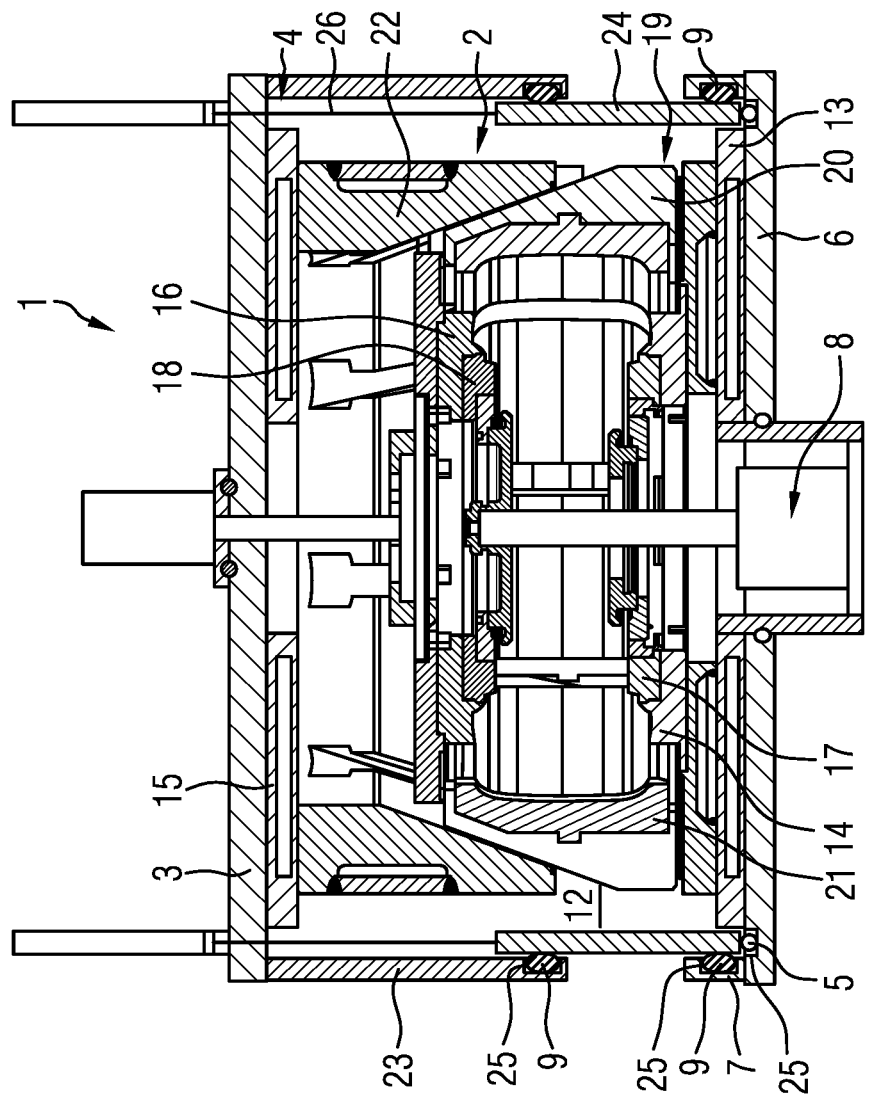
FIG. 2 shows the heating press of FIG. 1 in the closing phase after a first partial stroke.

FIG. 2 illustrates the heating press 1 of FIG. 1 in the closing phase after a first partial stroke $TH_1$.

The heating press upper part 3 is moved through the first partial stroke $TH_1$ and the second circular ring 24 is extended toward the heating press lower part 7, with the result that it rests on the heating press lower part 7 by overlapping the third circular ring 7 in the region of the ring seal 9. The ring seal 9 seals off the small intermediate space between the second circular ring 24 of the hood upper part 4 and the third circular ring 7 of the hood lower part when the second circular ring 24 rests on the hood lower part. A closed, vacuum-tight hood interior space 12 is obtained, while the vulcanization mold is closed only to some extent. If the ring seals 5, 9 are a hose of variable diameter, they are inflated in order to seal off the hood 4, 7 in a vacuum-tight manner. The connection between the vacuum tank 11 and the hood interior space 12 is opened in order to generate a partial vacuum, by way of pressure equalization between the vacuum tank 11 and the hood interior space 12, in the hood interior space 12 that has been closed in a vacuum-tight manner. When the partial vacuum has been generated in the hood interior space 12, the connection between the vacuum tank 11 and the hood 4, 7 is closed, the connection between the hood interior space 12 and the pump 10 is opened and the remaining air is pumped out of the hood interior space 12 to generate the vacuum.

Figure 3:
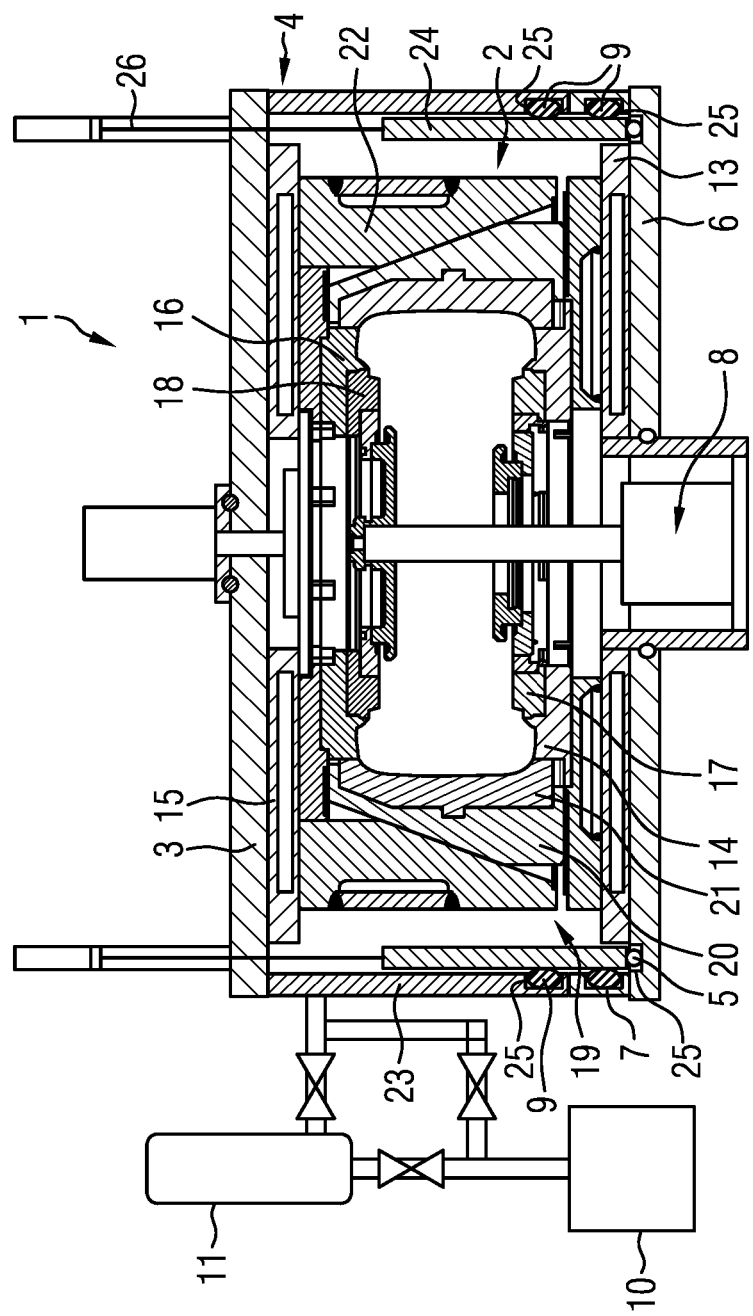
FIG. 3 shows the heating press of FIG. 1 and of FIG. 2 in the closed state after a second partial stroke.

FIG. 3 shows the heating press of FIG. 1 and of FIG. 2 in the closed state after a second partial stroke $TH_2$. After a vacuum has been generated in the interior space 12 of the closed hood 4, 7 of FIG. 2, the performance of a second partial stroke $TH_2$, during which the second circular ring 24 is retracted in over the first circular ring 23, then causes the vulcanizing mold, which has been evacuated of air, to be completely closed and the connection between the vacuum tank 11 and the hood 4, 7 to be closed.

Then, the connection between the hood interior space 12 and the pump 10 is closed. The green tire is vulcanized.

The sum of the first partial stroke $TH_1$ and the second partial stroke $TH_2$ yields the total stroke GH. The tire is vulcanized. In the case of a passenger motor vehicle tire, the vulcanization thereof takes approximately 15 minutes. During this time, the connection between pump 10 and vacuum tank 11 is opened in order to generate a vacuum in the vacuum tank 11, wherein the connection of the pump 10 to the hood 4, 7 and the connection of the vacuum tank 11 to the hood 4, 7 are each closed. After the vulcanization of the tire is complete, the volume of the hood interior space 12 is aerated via a valve (not illustrated), and the heating press 1 is opened in order to unload the fully vulcanized tire from the container 2 having the vulcanizing mold. To that end, the hood upper part 4 is first of all advanced, the second circular ring 24 is retracted in over the first circular ring 23, and the profile segments 21 are moved outward in a radial direction P2 at the same time. The tire is released.

In the following further embodiments of a heating press 1 according to the invention that are shown in FIGS. 4 to 11, almost all the elements and functions have the same configuration as in the first embodiment. Differences exist only in terms of the relative size of the diameter of the second circular ring 24 of the hood upper part 4 to the diameter of the third circular ring 7 of the hood lower part. Therefore, merely a different arrangement of the sealing ring 9 between the second circular ring 24 of the hood upper part 4 and the third circular ring 7 of the hood lower part will be discussed.

Therefore, merely the first circular ring 23 and the second circular ring 24 of the hood upper part 4 and the third circular ring 7 of the hood lower part, and the vacuum-tight seals between the two circular rings 23, 24 of the hood upper part and between the second circular ring 24 of the hood upper part and the third circular ring of the hood lower part, are provided with reference signs.

All other elements of the heating press are not explicitly provided with reference signs and the means, connected to the heating press, for generating a vacuum in the interior space of the hood of the heating press, such as the pump, the vacuum tank and associated lines and valves, are not shown in FIGS. 4 to 11 for the sake of simplicity, even though they are present in the heating presses shown in the same way as in FIG. 3. The elements of the heating press that are not provided with reference signs and the means, which are not shown, for generating a vacuum in the interior space of the hood of the heating press have already been described in connection with the first embodiment, as have their function and the overall mode of operation of a heating press according to the invention.

Figure 4:
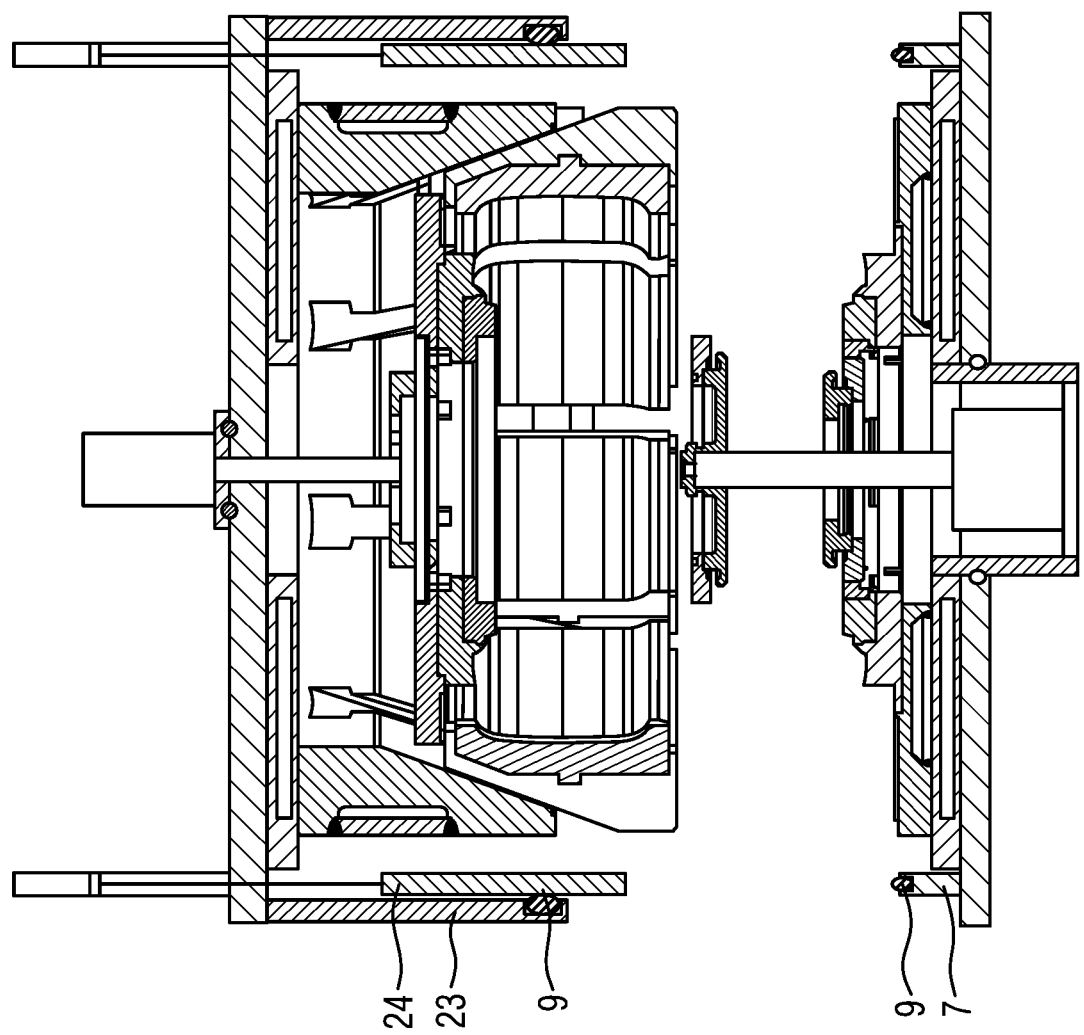
FIG. 4 shows a second embodiment of a heating press according to the invention with a container in the open state.

FIG. 4 shows a second embodiment of a heating press according to the invention with a container 2 in the open state. The hood upper part has a first and a second circular ring 23, 24, wherein the second circular ring 24 is provided with a smaller diameter than the first circular ring 23. The second circular ring 24 can be telescopically retracted and extended on the first circular ring 23 in an axial direction P1 by means of an actuator 26. The hood lower part 7 has a third circular ring. The diameter of the second circular ring 24 of the hood upper part is exactly the same size as the diameter of the third circular ring 7 of the hood lower part.

The hood upper part 4 and the hood lower part 7 are airtight, or vacuum-tight, and in the closed state form a vacuum-tight hood interior space 12. To that end, ring seals 9 are provided. A ring seal 9 is arranged between the first and the second circular ring 23, 24 in a groove 25, which is arranged in the first circular ring 23 and faces the second circular ring 24, for an airtight hood upper part 4. Similarly, the third circular ring 23 has a vacuum-tight ring seal 9 around the periphery at its upper end. Therefore, the closed hood is airtight at the joints between the hood upper part 4 and the hood lower part 7, and between the first and the second circular ring 23, 24. The ring seal 9 is a hose of variable diameter. The diameter of the ring seal 9 is slightly greater than the depth 27 of the groove 25 in which it is arranged.

Figure 5:
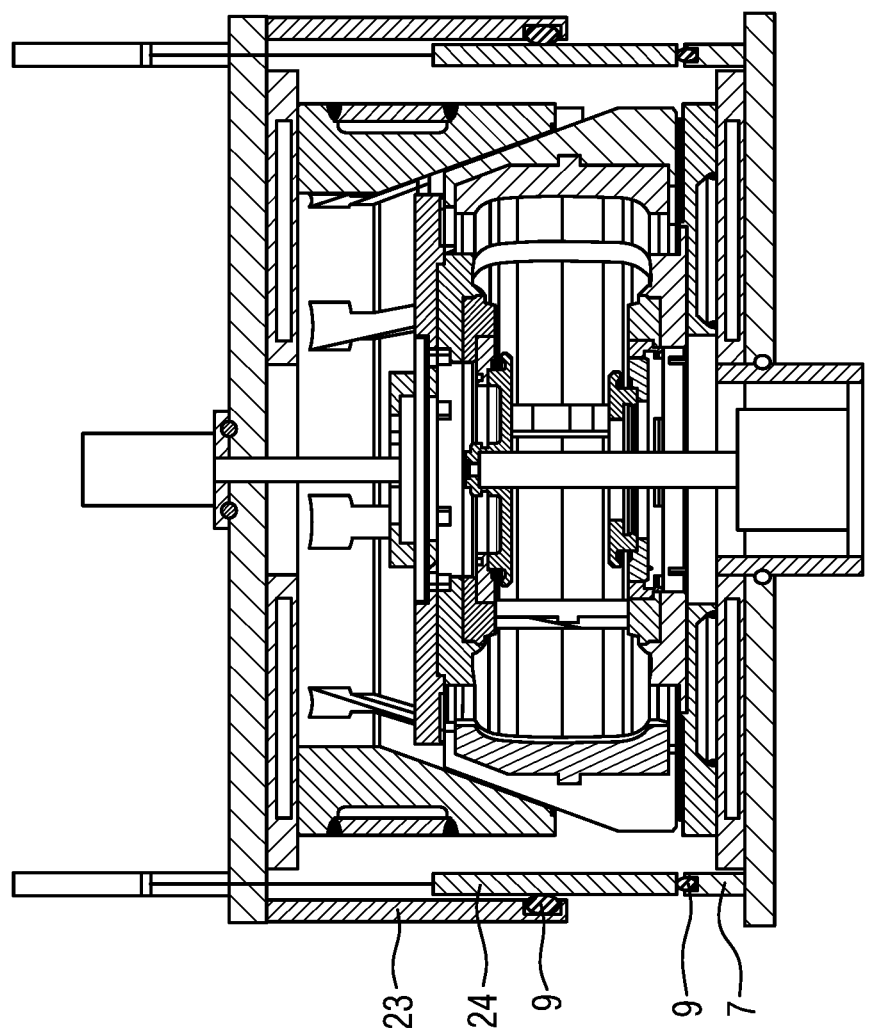
FIG. 5 shows the heating press of FIG. 4 in the closing phase after a first partial stroke.

FIG. 5 illustrates the heating press 1 of FIG. 4 in the closing phase after a first partial stroke $TH_1$.

The heating press upper part 3 is moved through the first partial stroke $TH_1$ and the second circular ring 24 is extended toward the heating press lower part 7, with the result that it rests on the third circular ring 7 of the heating press lower part 7. The ring seal 9 at the upper end of the third circular ring 7 then provides sealing between the second circular ring 24 of the hood upper part 4 and the third circular ring 7 of the hood lower part when the second circular ring 24 rests on the hood lower part. A closed, vacuum-tight hood interior space 12 is obtained, while the vulcanization mold is closed only to some extent. If the ring seals 9 are a hose of variable diameter, they are inflated in order to seal off the hood 4, 7 in a vacuum-tight manner.

Figure 6:
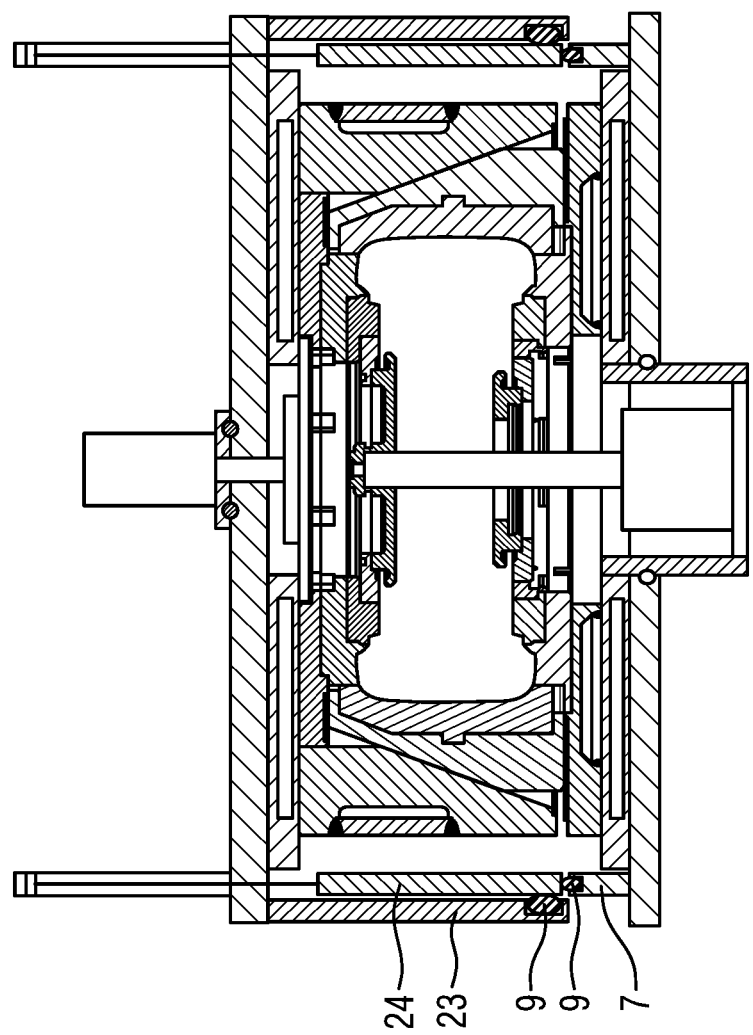
FIG. 6 shows the heating press of FIG. 4 and of FIG. 5 in the closed state after a second partial stroke.

FIG. 6 shows the heating press of FIG. 4 and of FIG. 5 in the closed state after a second partial stroke $TH_2$. After a vacuum has been generated in the interior space 12 of the closed hood 4, 7 of FIG. 5, the performance of a second partial stroke $TH_2$, during which the second circular ring 24 is retracted in over the first circular ring 23, then causes the vulcanizing mold, which has been evacuated of air, to be completely closed.

Figure 7:
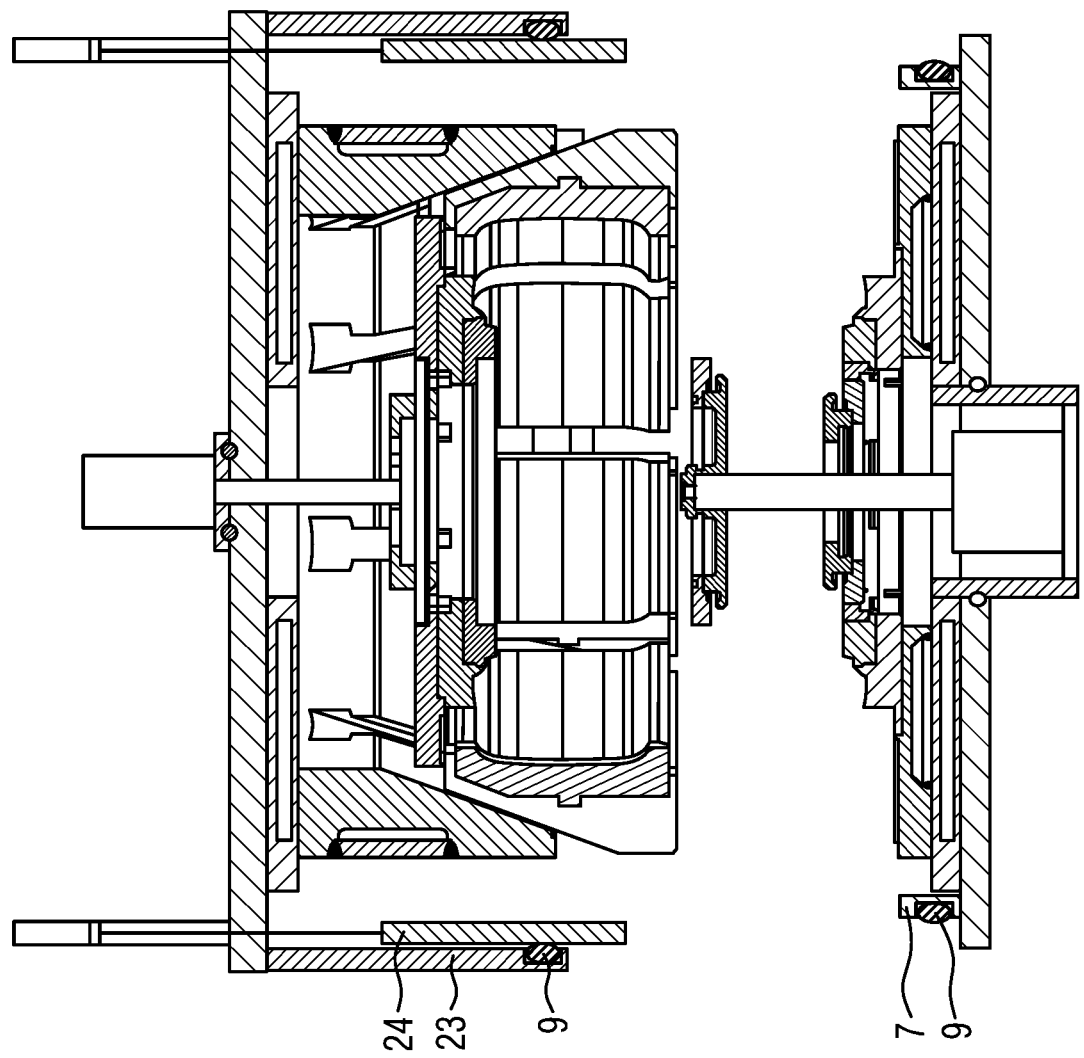
FIG. 7 shows a third embodiment of a heating press according to the invention with a container in the open state.

FIG. 7 shows a third embodiment of a heating press according to the invention with a container 2 in the open state. The hood upper part 4 has a first and a second circular ring 23, 24, wherein the second circular ring 24 is provided with a smaller diameter than the first circular ring 23. The second circular ring 24 can be telescopically retracted and extended on the first circular ring 23 in an axial direction P1 by means of an actuator 26. The hood lower part 7 has a third circular ring. The diameter of the second circular ring 24 of the hood upper part is slightly greater than the diameter of the third circular ring 7 of the hood lower part.

The hood upper part 4 and the hood lower part 7 are airtight, or vacuum-tight, and in the closed state form a vacuum-tight hood interior space 12. To that end, ring seals 9 are provided. A ring seal 9 is arranged between the first and the second circular ring 23, 24 in a groove 25, which is arranged in the first circular ring 23 and faces the second circular ring 24, for an airtight hood upper part 4. Similarly, the third circular ring 23 has a vacuum-tight ring seal 9 around the periphery on its outer side. Therefore, the closed hood is airtight at the joints between the hood upper part 4 and the hood lower part 7, and between the first and the second circular ring 23, 24. The ring seal 9 is a hose of variable diameter. The diameter of the ring seal 9 is slightly greater than the depth 27 of the groove 25 in which it is arranged.

Figure 8:
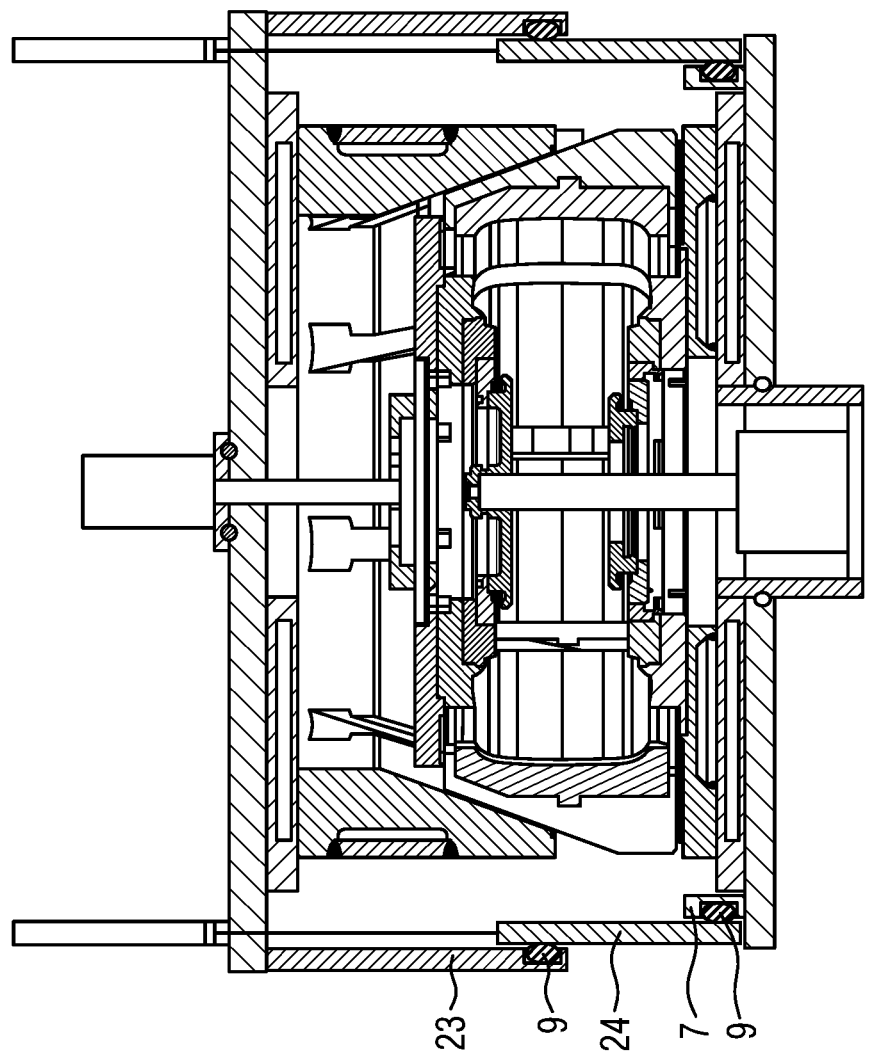
FIG. 8 shows the heating press of FIG. 7 in the closing phase after a first partial stroke.

FIG. 8 illustrates the heating press 1 of FIG. 7 in the closing phase after a first partial stroke $TH_1$.

The heating press upper part 3 is moved through the first partial stroke $TH_1$ and the second circular ring 24 is extended toward the heating press lower part 7, with the result that it rests on the heating press lower part 7. The ring seal 9 on the outer side of the third circular ring 7 then seals off the small intermediate space between the second circular ring 24 of the hood upper part 4 and the third circular ring 7 of the hood lower part when the second circular ring 24 rests on the hood lower part. A closed, vacuum-tight hood interior space 12 is obtained, while the vulcanization mold is closed only to some extent. If the ring seals 9 are a hose of variable diameter, they are inflated in order to seal off the hood 4, 7 in a vacuum-tight manner.

Figure 9:
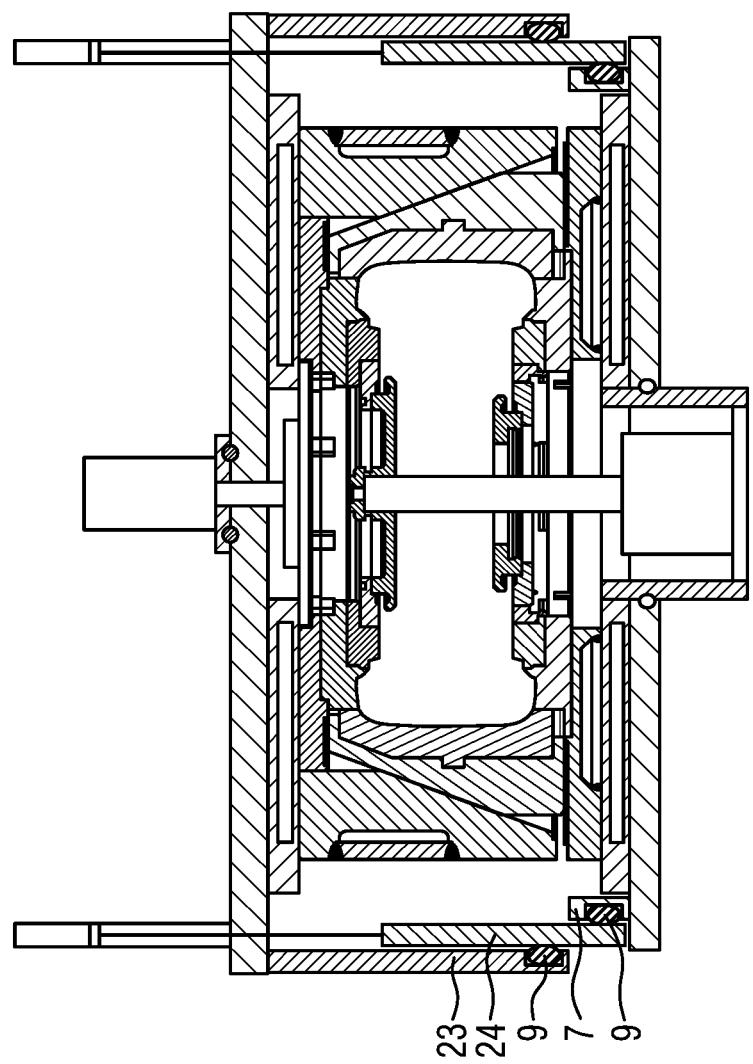
FIG. 9 shows the heating press of FIG. 7 and of FIG. 8 in the closed state after a second partial stroke.

FIG. 9 shows the heating press of FIG. 7 and of FIG. 8 in the closed state after a second partial stroke $TH_2$. After a vacuum has been generated in the interior space 12 of the closed hood 4, 7 of FIG. 8, the performance of a second partial stroke $TH_2$, during which the second circular ring 24 is retracted in over the first circular ring 23, then causes the vulcanizing mold, which has been evacuated of air, to be completely closed.

Figure 10:
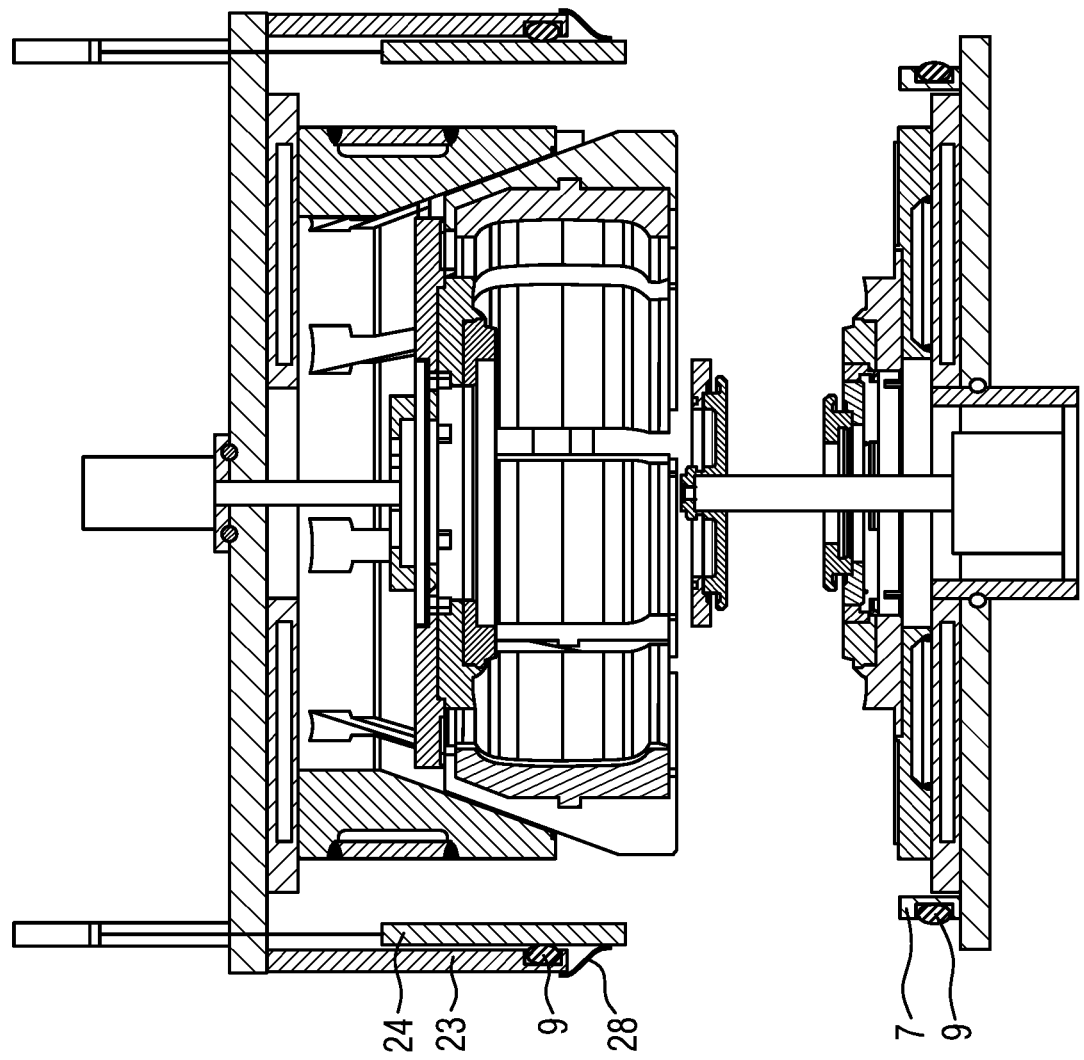
FIG. 10 shows a fourth embodiment of a heating press according to the invention with a container in the open state.

FIG. 10 shows a fourth embodiment of a heating press according to the invention with a container 2 in the open state. The embodiment differs from the previously described third embodiment merely in that an elastically extensible, vacuum-tight rubber sleeve 28 is provided as additional vacuum-tight seal between the first circular ring 23 and the second circular ring 24 of the hood upper part 4. This is secured in a circular shape on the outside of the lower part of each of the two circular rings 23, 24.

Figure 11:
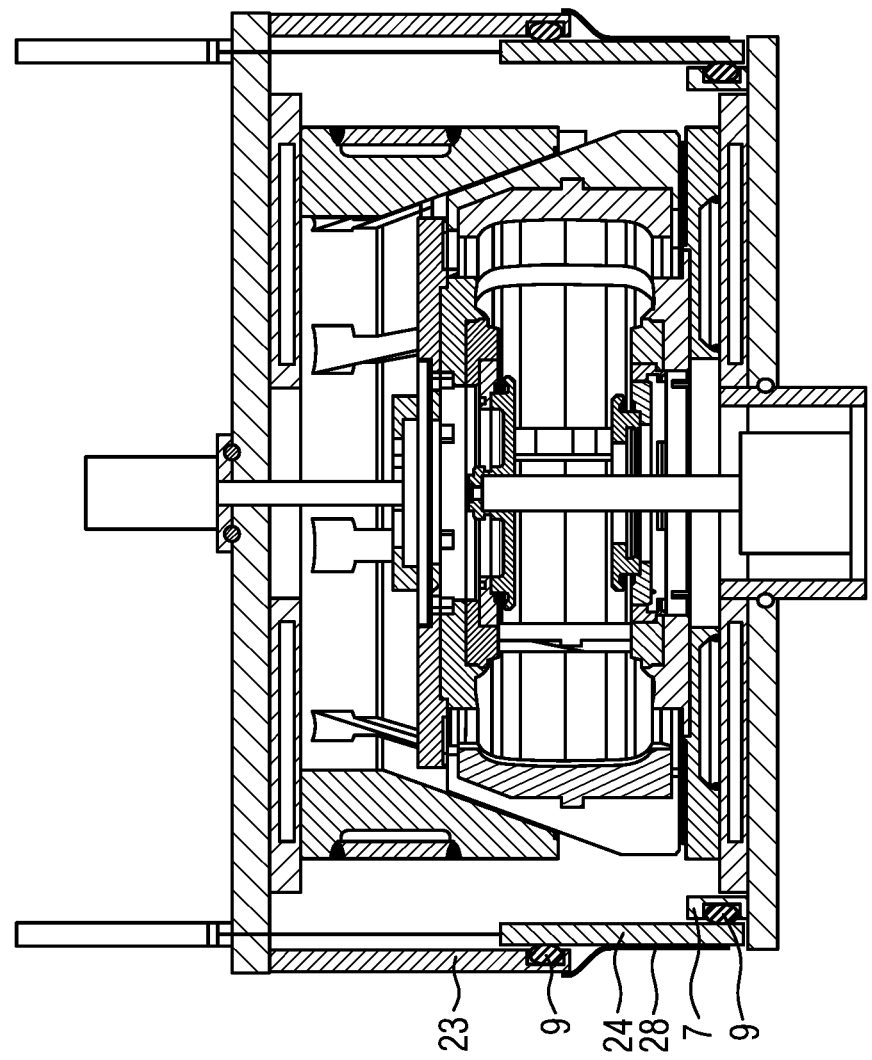
FIG. 11 shows the heating press of FIG. 10 in the closing phase after a first partial stroke.

FIG. 11 illustrates the heating press 1 of FIG. 10 in the closing phase after a first partial stroke $TH_1$.

The heating press upper part 3 is moved through the first partial stroke $TH_1$ and the second circular ring 24 is extended toward the heating press lower part 7, with the result that it rests on the heating press lower part 7. This causes the rubber sleeve 28, which is fastened to both circular rings 23, 24, to extend in the direction of the stroke.

The invention claimed is:

1. A heating press (1) for vulcanizing a vehicle tire under a vacuum,
    having a heating press upper part (3) and a heating press lower part (6), wherein the heating press upper part (3) has a hood upper part (4) mounted thereon and a container (2), which contains mold parts (16, 18, 21) of a vulcanizing mold, in this hood upper part (4), wherein the hood upper part (4) has a first circular ring (23), which is arranged fixedly on the heating press upper part (3), and a second circular ring (24), which adjoins this first circular ring coaxially in an axial direction (P1) and can be telescopically retracted and extended on the inside of the first circular ring in the axial direction (P1),
    wherein the heating press upper part (3) and the heating press lower part (6) are connected to the container (2) such that, when the heating press upper part (3) is being lowered through a total stroke (GH) that takes place in the axial direction (P1), during which total stroke an open end of the hood upper part (4) moves onto the heating press lower part (6), the mold parts (14, 16, 17, 18, 21) of the vulcanizing mold can be closed in a radial direction (P2),
    wherein vacuum-tight seals (5, 9) are arranged between the first and second circular rings (23, 24) and between the second circular ring (24) and the heating press lower part (6),
    wherein the total stroke (GH) can be traveled in a manner composed of a first partial stroke (TH1) and a second partial stroke (TH2),
    wherein, after the first partial stroke (TH1), the hood upper part (3) is moved in such a way that it rests on the heating press lower part (6) by way of the extended second circular ring (24) to thereby enclose an interior space, and the interior space can be closed in a vacuum-tight manner by the seals (5, 9) while the vulcanizing mold is still open in an air-permeable manner and wherein a pump (10) and a vacuum tank (11), by way of which a vacuum can be generated in the interior space after the first partial stroke (TH1), are provided, wherein the vacuum tank (11) and the pump (10) are connected to the interior space, and wherein the vacuum tank (11) and the pump (10) are connected to one another, and wherein, after the second partial stroke (TH2), the hood upper part (3) is moved in such a way that the second circular ring (24) is retracted further relative to the first circular ring (23) and the vulcanizing mold can be completely closed under vacuum conditions in the interior space.

2. The heating press of claim 1, wherein a hydraulic, pneumatic or electric actuator (26), which can move the second circular ring (24) of the hood upper part (3) in the axial direction (P1), is provided.

3. The heating press of claim 1, wherein a hood lower part (7) in the form of a third circular ring is arranged on the heating press lower part (6), wherein the first circular ring (23) of the hood upper part (3) and the third circular ring of the hood lower part (7) have the same inside diameter and the same outside diameter and are arranged in line with one another in the heating press (1).

4. The heating press of claim 1, wherein the seals are ring seals (5, 9), and at least one ring seal (9) is arranged in the lower region of the hood upper part (4) and at least one further ring seal (9) is arranged in the upper region of the hood lower part (7).

5. The heating press of claim 4, wherein the ring seals (5, 9) are arranged in circular-ring-shaped grooves (25), wherein a diameter of the ring seals (5, 9) is slightly greater than a depth of the grooves (25).

6. The heating press of claim 5, wherein the ring seals (5, 9) consist of solid material.

7. The heating press of claim 6, wherein the ring seals (5, 9) are hoses of variable diameter.

8. The heating press of claim 7, wherein the ring seals (5, 9) are differentially inflated double ring seals.

9. The heating press of claim 1, wherein sliding bands composed of wear-resistant high-temperature polymer are arranged in the upper and lower hood parts (4, 7) in the region above and/or below the ring seals (9).

10. The heating press of claim 1, wherein the vacuum tank (11) has a volume that is approximately 5 to 10 times greater than a volume formed by the upper and lower hood parts (4, 7) when closed.

11. A method for vulcanizing a pneumatic vehicle tire under a vacuum, the method comprising:

providing the heating press according to claim 1, and operating the heating press including the following steps:

a) loading the open heating press (1) by inserting the green tire for vulcanization into the container (2), wherein the second circular ring (24) of the hood upper part (4) is retracted on the inside of the first circular ring (23), b) moving the heating press upper part (3) through the first partial stroke (TH1), extending the second circular ring (24) toward the heating press lower part (6) until it rests on the heating press lower part (6), in order to close the interior space (12), while the vulcanizing mold is only closed to some extent, c) opening the connection between the vacuum tank (11) and the interior space (12) in order to generate a partial vacuum, by way of pressure equalization between the vacuum tank (11) and the interior space (12), in the interior space (12) that has been closed in a vacuum-tight manner, d) when the partial vacuum is obtained in the interior space (12): closing the connection between the vacuum tank (11) and the interior space (12), opening the connection between the interior space (12) and the pump (10), and pumping the remaining air out of the interior space (12) in order to generate the vacuum, e) moving the heating press upper part (3) through the second partial stroke (TH2), during which the second circular ring (24) is retracted on the inside of the first circular ring (23), with the result that the vulcanizing mold is completely closed, and subsequently closing the connection between the interior space (12) and the pump (10), f) vulcanizing the green tire and opening the connection between the pump (10) and the vacuum tank (11) and generating a vacuum in the vacuum tank (11), wherein the connection of the pump (10) to the interior space (12) and the connection of the vacuum tank (11) to the interior space (12) are each closed, g) opening the heating press (1) and unloading the fully vulcanized tire, and repeating the steps a)-g) in order to vulcanize each further tire.

12. The method of claim 11, step g) is preceded by opening a further valve in order to deplete the vacuum and subsequently closing it again.

* * * * *